US012638652B2

(12) United States Patent
Pollock et al.

(10) Patent No.: US 12,638,652 B2
(45) Date of Patent: May 26, 2026

(54) TECHNIQUES FOR ALIGNMENT OF TARGET AND LOCAL OSCILLATOR BEAMS TO PHOTODIODE DETECTOR

(71) Applicant: AEVA, INC., Mountain View, CA (US)

(72) Inventors: Kevin Larson Pollock, San Jose, CA (US); Adrian Cort, San Francisco, CA (US); Keith Gagne, Santa Clara, CA (US); Bradley Scot Levin, San Jose, CA (US)

(73) Assignee: AEVA, INC., Mountain View, CA (US)

( * ) Notice: Subject to any disclaimer, the term of this patent is extended or adjusted under 35 U.S.C. 154(b) by 787 days.

(21) Appl. No.: 18/104,173

(22) Filed: Jan. 31, 2023

(65) Prior Publication Data

US 2024/0255722 A1 Aug. 1, 2024

(51) Int. Cl.
| | |
|---|---|
| *G02B 7/00* | (2021.01) |
| *G01S 7/481* | (2006.01) |
| *G01S 7/4861* | (2020.01) |
| *G01S 7/4865* | (2020.01) |
| *G01S 17/34* | (2020.01) |
| *G02B 7/02* | (2021.01) |

(52) U.S. Cl.
CPC ............ *G02B 7/003* (2013.01); *G01S 7/4813* (2013.01); *G01S 7/4861* (2013.01); *G01S 7/4866* (2013.01); *G01S 17/34* (2020.01); *G02B 7/023* (2013.01)

(58) Field of Classification Search
CPC ........ G02B 7/003; G02B 7/023; G02B 27/62; G01S 17/34; G01S 7/4972
See application file for complete search history.

(56) References Cited

U.S. PATENT DOCUMENTS

| | | | | | |
|---|---|---|---|---|---|
| 4,797,619 | A | * | 1/1989 | Austin | ................. G01J 1/4257 356/406 |
| 10,914,821 | B2 | * | 2/2021 | Patterson | .............. G01S 7/4815 |
| 2003/0206288 | A1 | * | 11/2003 | Tabirian | ................ G01J 1/4257 356/121 |
| 2021/0325610 | A1 | * | 10/2021 | Rogers | ................. G01S 7/4818 |

* cited by examiner

*Primary Examiner* — Yuqing Xiao
*Assistant Examiner* — Jempson Noel
(74) *Attorney, Agent, or Firm* — Womble Bond Dickinson (US) LLP

(57) ABSTRACT
A method of aligning an optical lens in a LiDAR system includes emitting an optical beam by an optical source. The method includes placing the optical lens in front of a photodetector at a first predetermined position. The method further includes moving the optical lens to a plurality of Z-positions along a direction of an optical axis, the plurality of Z-positions corresponding to a plurality of parameter values of the LO signal. The method further includes generating a fitting function based on a set of values of the LO signal; and determining a parameter value of the LO signal for each Z-position. The method includes determining an initial Z-axis position of the optical lens by selecting a Z-position from the plurality of Z-positions based on a plurality of parameter values. The method includes determining a final Z-position of the optical lens by adding an offset to the initial Z-axis position.

20 Claims, 13 Drawing Sheets $$y = 1/(1 + \exp(a(x - x_0)))$$
$a$ = slope coefficient
$x_0$ = offset

1000

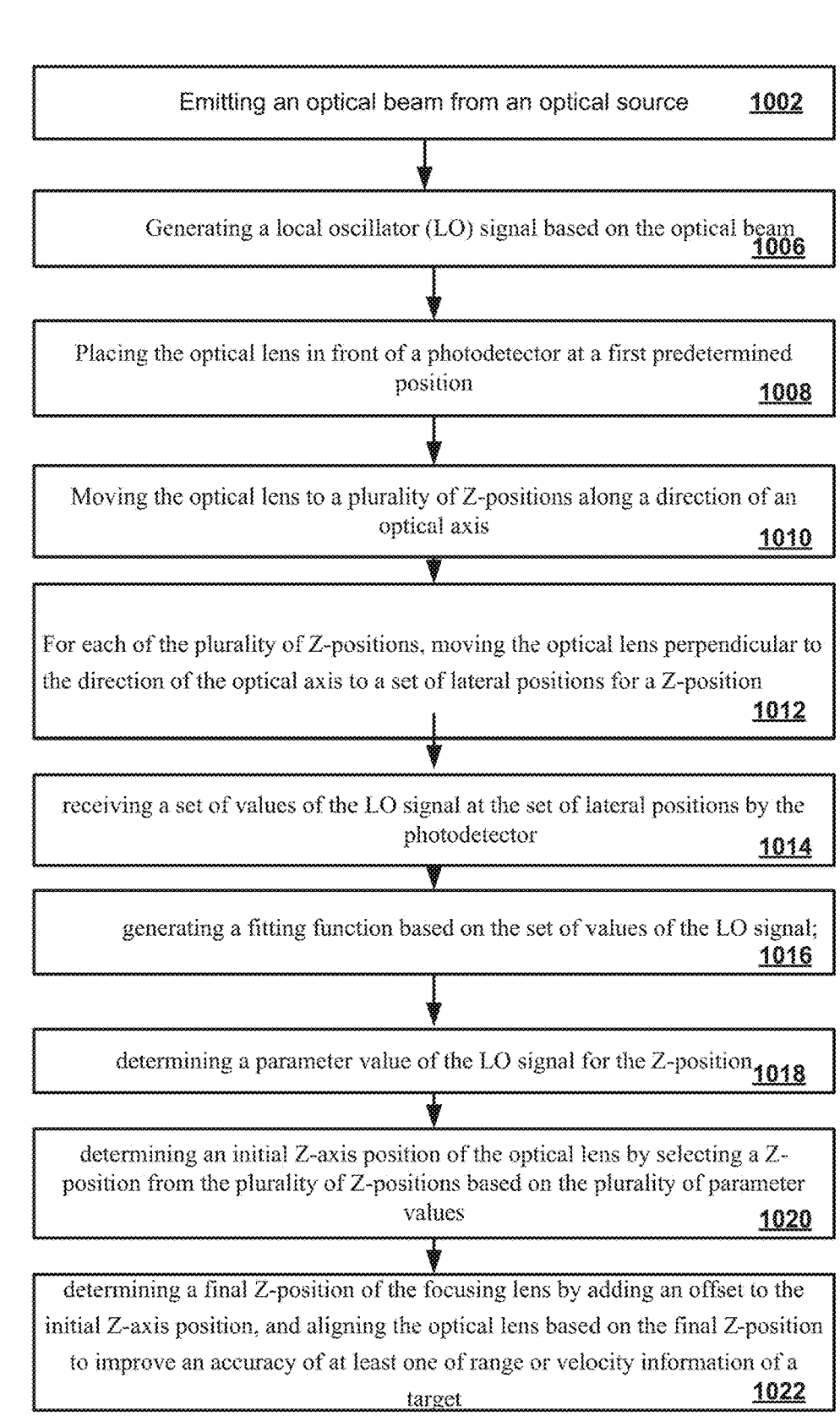

Emitting an optical beam from an optical source     1002

Generating a local oscillator (LO) signal based on the optical beam     1006

Placing the optical lens in front of a photodetector at a first predetermined position     1008

Moving the optical lens to a plurality of Z-positions along a direction of an optical axis     1010

For each of the plurality of Z-positions, moving the optical lens perpendicular to the direction of the optical axis to a set of lateral positions for a Z-position     1012 receiving a set of values of the LO signal at the set of lateral positions by the photodetector     1014 generating a fitting function based on the set of values of the LO signal;     1016 determining a parameter value of the LO signal for the Z-position     1018 determining an initial Z-axis position of the optical lens by selecting a Z-position from the plurality of Z-positions based on the plurality of parameter values     1020 determining a final Z-position of the focusing lens by adding an offset to the initial Z-axis position, and aligning the optical lens based on the final Z-position to improve an accuracy of at least one of range or velocity information of a target     1022

FIG. 10

TECHNIQUES FOR ALIGNMENT OF TARGET AND LOCAL OSCILLATOR BEAMS TO PHOTODIODE DETECTOR

TECHNICAL FIELD

The present disclosure relates generally to light detection and ranging (LiDAR) systems, and more particularly to optical alignment techniques in a FMCW LiDAR system.

BACKGROUND

A FMCW LiDAR system mixes a local oscillator (LO) signal (e.g., LO beam) with a target return signal (e.g., target beam), which is the reflected light from a target, to extract range or velocity information. An optical lens is used to focus the target return signal and local signal onto the detector (e.g., photodetector). It is important to place the optical lens at a precise location in order to maximize the overall signal to noise ratio of the LiDAR system. However, it is very difficult to align the optical lens with respect to the LO signal and the target return signal to find the precise location for the optical lens.

SUMMARY

The present disclosure describes various examples of optical alignment techniques in a FMCW LiDAR system.

In some examples, disclosed herein are an optical subsystem of a LiDAR system and methods of aligning an optical lens with respect to the LO signal and the target return signal in the LiDAR system. The terms "LO signal" and "LO beam" are used interchangeably herein in this disclosure. The terms "target return signal" and "target return beam" are used interchangeably herein in this disclosure. The optical lens may be actively placed in a precise location by different fitting techniques to maximize the overall signal to noise ratio of the LiDAR system. For example, the optical lens is placed at a test position away from the detector. Then, the lens is moved laterally (parallel to the surface of the detector) to direct the LO beam across the detector, e.g., automatically on a translational stage by a processor. The response of the detector gives a characteristic line shape which can be fitted by a fitting function. The fitting function may be a full fitting function (e.g., a Gaussian fitting function) or a half fitting function (e.g., Sigmoid fitting function). The fitting function determines the characteristics of the LO beam (e.g., LO beam width, the line shape slope coefficient) at the detector for the test position. The optical lens is then moved to a new test position and the process is repeated. The characteristics of the LO beam at each test position is plotted to find the minimum beam width of the LO beam. The optical lens is placed at a known offset from the minimum beam width position. By this way, the optical lens is placed in a precise location along all three axes with high accuracy and fast speed. The signal to noise ratio (SNR) at the detector is increased, and the performance of the LiDAR system is improved.

In some examples, a method of aligning an optical lens in a frequency modulated continuous wave (FMCW) LiDAR system is disclosed herein. The method includes emitting an optical beam by an optical source. The method includes generating a local oscillator (LO) signal based on the optical beam. The method includes placing the optical lens in front of a photodetector at a first predetermined position. The method includes moving the optical lens to a plurality of Z-positions along a direction of an optical axis, the plurality of Z-positions corresponding to a plurality of parameter values of the LO signal. The method includes for each of the plurality of Z-positions, moving the optical lens perpendicular to the direction of the optical axis to a set of lateral positions for a Z-position; receiving a set of values of the LO signal at the set of lateral positions by the photodetector; generating a fitting function based on the set of values of the LO signal; and determining a parameter value of the LO signal for the Z-position. The method includes determining an initial Z-axis position of the optical lens by selecting a Z-position from the plurality of Z-positions based on the plurality of parameter values. The method includes determining a final Z-position of the optical lens by adding an offset to the initial Z-axis position. The method includes aligning the optical lens based on the final Z-position to improve an accuracy of at least one of range or velocity information of a target.

In some examples, a LiDAR system is disclosed herein. The LiDAR system includes a processor; and a memory to store instructions that, when executed by the processor, cause the LiDAR system to: emit an optical beam by an optical source; generate a local oscillator (LO) signal based on the optical beam; place the optical lens in front of a photodetector at a first predetermined position; move the optical lens to a plurality of Z-positions along a direction of an optical axis, the plurality of Z-positions corresponding to a plurality of parameter values of the LO signal, for each of the plurality of Z-positions, move the optical lens perpendicular to the direction of the optical axis to a set of lateral positions for a Z-position; receive a set of values of the LO signal at the set of lateral positions by the photodetector; generate a fitting function based on the set of values of the LO signal; and determine a parameter value of the LO signal for the Z-position; determine an initial Z-axis position of the optical lens by selecting a Z-position from the plurality of Z-positions based on the plurality of parameter values; determine a final Z-position of the optical lens by adding an offset to the initial Z-axis position; and align the optical lens based on the final Z-position to improve an accuracy of at least one of range or velocity information of a target.

In some examples, a LiDAR system is disclosed herein. The LiDAR system includes an optical source to emit an optical beam; a local oscillator (LO) to generate an LO signal based on the optical beam; a photodetector to receive the LO signal and a target return signal; a circuitry; and a memory to store instructions that, when executed by the circuitry, cause the LiDAR system to: place the optical lens in front of a photodetector at a first predetermined position; move the optical lens to a plurality of Z-positions along a direction of an optical axis, the plurality of Z-positions corresponding to a plurality of parameter values of the LO signal, for each of the plurality of Z-positions, move the optical lens perpendicular to the direction of the optical axis to a set of lateral positions for a Z-position; receive a set of values of the LO signal at the set of lateral positions by the photodetector; generate a fitting function based on the set of values of the LO signal; and determine a parameter value of the LO signal for the Z-position; determine an initial Z-axis position of the optical lens by selecting a Z-position from the plurality of Z-positions based on the plurality of parameter values; determine a final Z-position of the optical lens by adding an offset to the initial Z-axis position; and align the optical lens based on the final Z-position to improve an accuracy of at least one of range or velocity information of a target.

It should be appreciated that, although one or more embodiments in the present disclosure depict the use of point clouds, embodiments of the present disclosure are not limited as such and may include, but are not limited to, the use of point sets and the like.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements:

FIG. 10 is a flow diagram illustrating an example of a method of aligning an optical lens in a LiDAR system in a LiDAR system according to embodiments of the present disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Figure 1A:
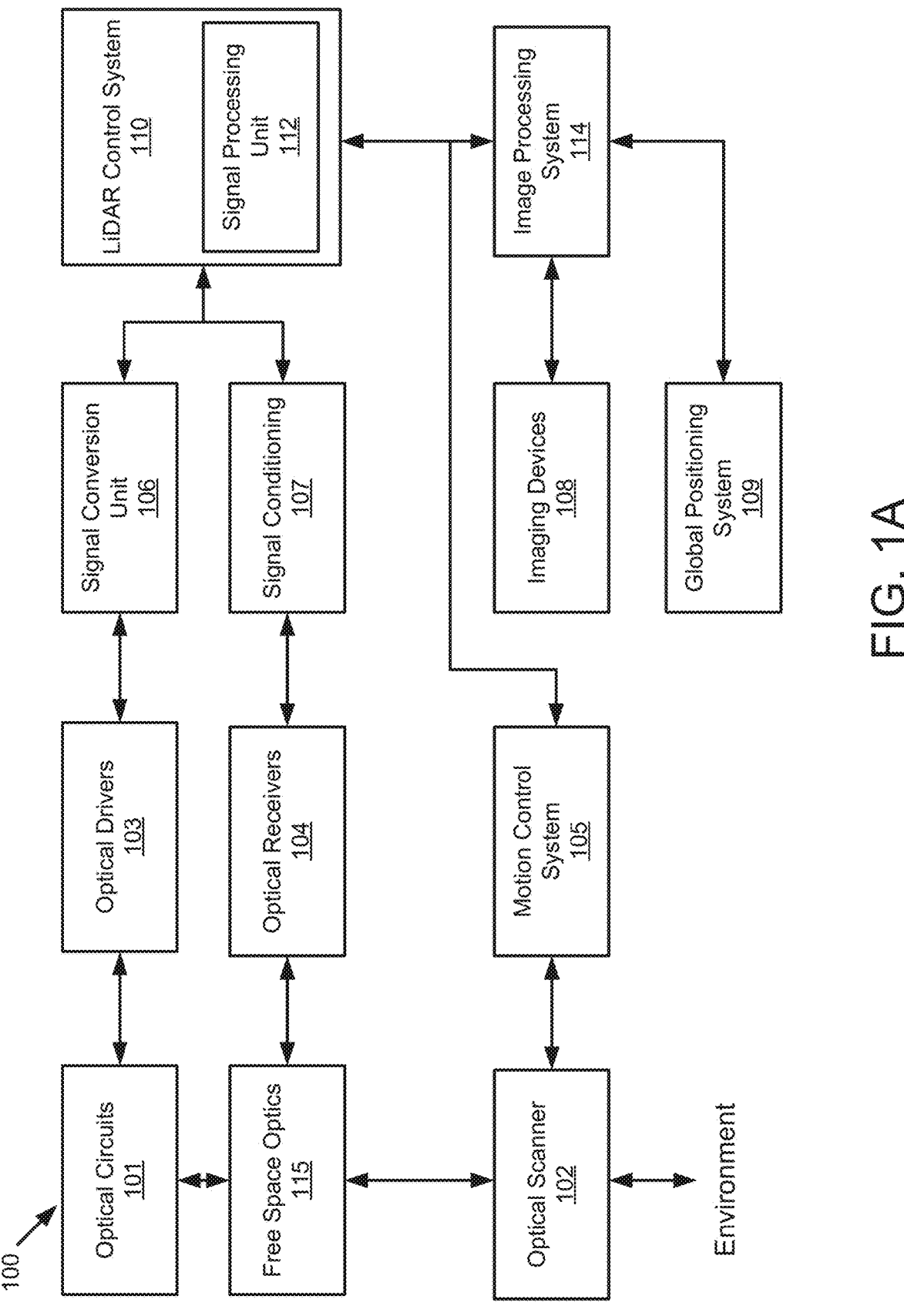
FIG. 1A illustrates a LiDAR system according to example implementations of the present disclosure.

FIG. 1A illustrates a LiDAR system 100 according to example implementations of the present disclosure. The LiDAR system 100 includes one or more of each of a number of components, but may include fewer or additional components than shown in FIG. 1A. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position or angle to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
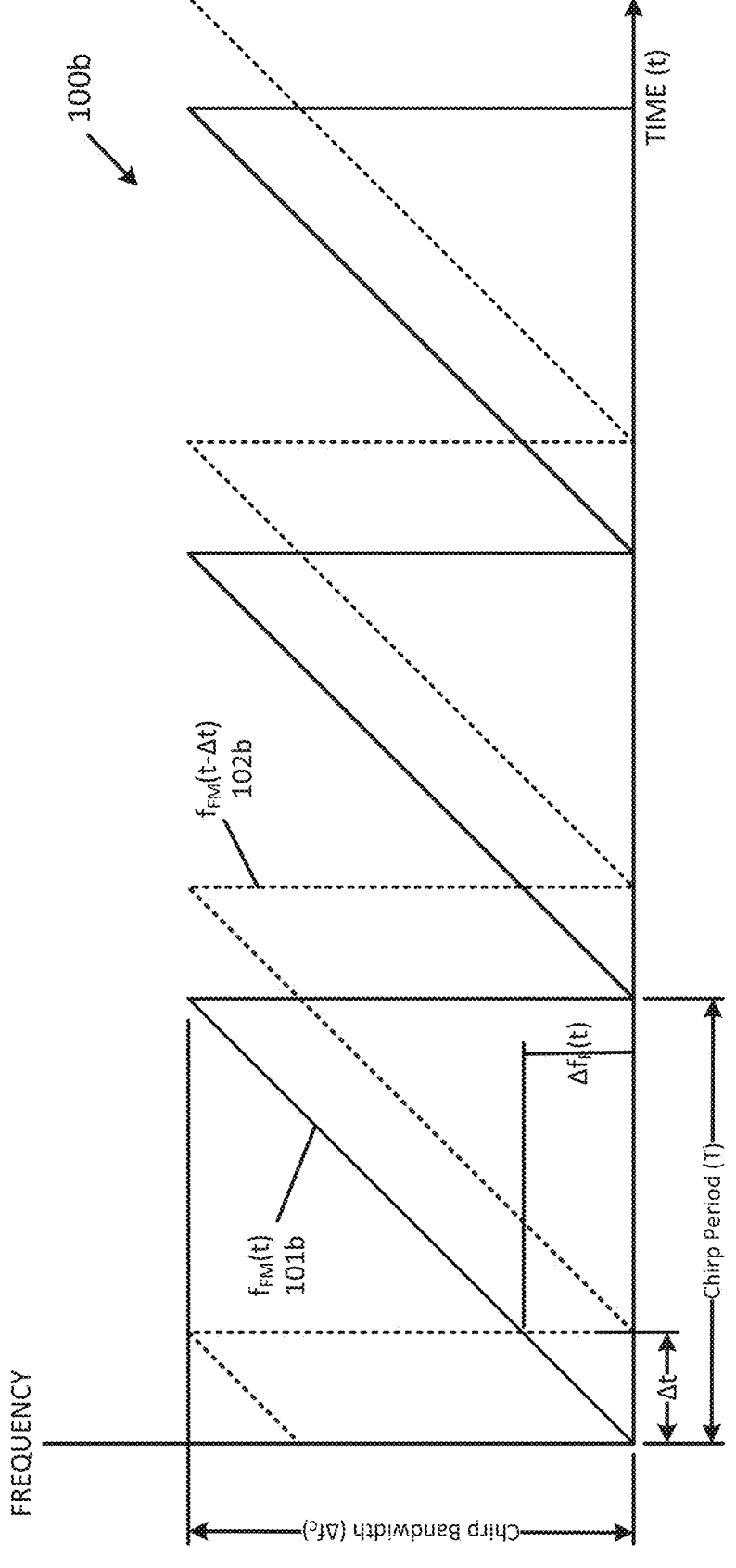
FIG. 1B is a time-frequency diagram illustrating an example of FMCW LIDAR waveforms according to embodiments of the present disclosure.

FIG. 1B is a time-frequency diagram 100b of an FMCW scanning signal 101b that can be used by a LiDAR system, such as system 100, to scan a target environment according to some embodiments. In one example, the scanning waveform 101b, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 1B also depicts target return signal 102b according to some embodiments. Target return signal 102b, labeled as $f_{FM}(t-\Delta t)$, is a time-delayed version of the scanning signal 101b, where $\Delta t$ is the round trip time to and from a target illuminated by scanning signal 101b. The round trip time is given as $\Delta t=2R/v$, where R is the target range and v is the velocity of the optical beam, which is the speed of light c. The target range, R, can therefore be calculated as $R=c(\Delta t/2)$. When the return signal 102b is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 102b will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 1B for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 2B:
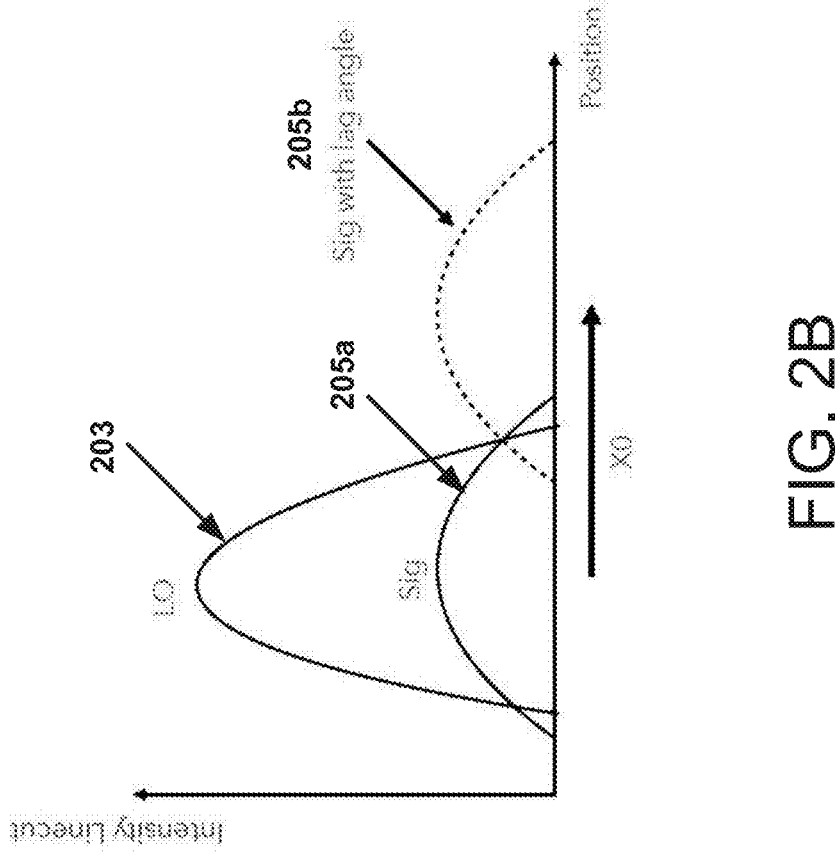
FIG. 2B is a diagram illustrating an example of intensity profile at a detection plane of a detector of a LiDAR system without descan compensation according to embodiments of the present disclosure.
Figure 2A:
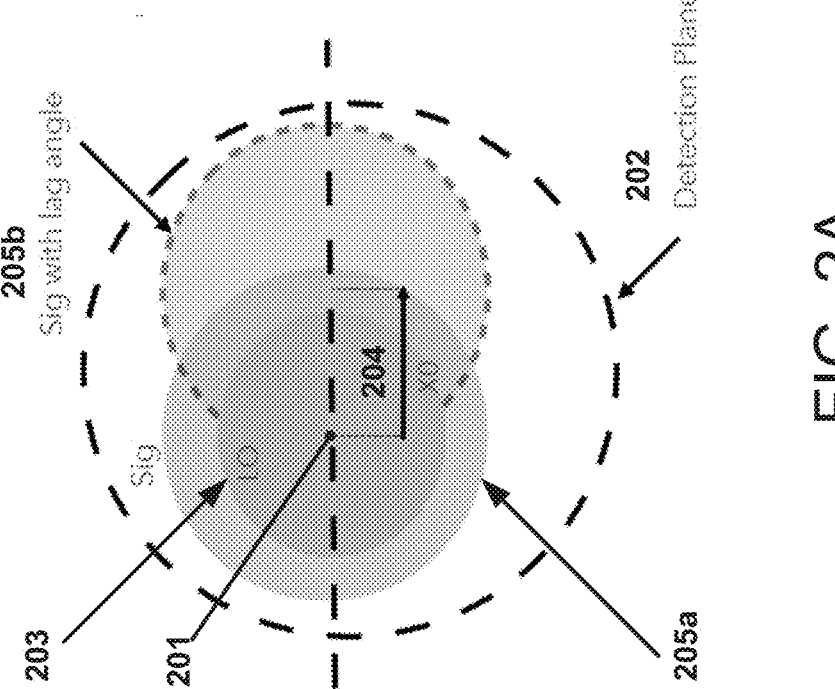
FIG. 2A is a diagram illustrating an example of a detection plane of a detector of a LiDAR system without descan compensation according to embodiments of the present disclosure.

FIG. 2A is a diagram illustrating an example of a detection plane 201 of a LiDAR system without descan compensation, according to embodiments of the present disclosure. FIG. 2B is a diagram illustrating an example of intensity profile at the detection plane 201 in FIG. 2A, according to some embodiments. Fast-scanning mirrors may be used to illuminate a scene in LIDAR systems. For example, one scanning mirror may scan fast along the X direction (horizon), while another scanning mirror scans may slow along the Y direction (elevation). The collected light has an altered frequency signature that is used to extract range information. As discussed above, the signal processing unit 112 (as illustrated in FIG. 1A) may generate a 3D point cloud with information about range and velocity of the target.

To increase the frame rate, while maintaining the same number of points per frame, usually the scan speed of the scanning mirror (e.g., in one direction) is increased. During the time the optical beam (frequency sweep) propagates to the distant target and returns to the scanning system, the scanning mirror moves due to a high scan speed (e.g., high rotational velocity) of the scanning mirror. The increased scan speed causes a spatial misalignment of the target signal with respect to the LO signal at the detector of the LiDAR system. This misalignment may severely degrade the spatial mixing efficiency of the target return signal and the LO signal, consequently reducing the overall signal to noise ratio of the LIDAR system. For example, when the scan speed of the scanning mirror is faster than 100 Hz at long ranges (>3000 degrees per second), the spatial mixing efficiency is severely degraded.

Referring to FIG. 2A and FIG. 2B, a LiDAR system (e.g., LiDAR system 100 in FIG. 1A) may include an optical subsystem with an optical axis 201. For example, a LO signal 203 and a target return signal 205a may be designed to overlap at a detection plane 202 of an optical receiver (e.g., one of optical receivers 104 in FIG. 1A). The LO signal 203 and the target return signal 205a may be designed to align around the optical axis 201. However, due to a high scan speed of a scanning mirror, the actual target return signal 205b may have a lag angle at the detection plane 202. As depicted in FIG. 2B, the intensity profile of the actual target return signal 205b may be shifted with the lag angle. With a high scan speed of the scanning mirror, a spatial misalignment 204 of the actual target return signal 205b with respect to the LO signal 203 may occur at the detector plane 202 of the LiDAR system. The spatial misalignment reduces the overall signal to noise ratio of the LIDAR system. As an example, a descan may refer to the target return signal being shifted with an angle at the detector plane, e.g., due to the high scan speed. The LiDAR system mixes the target return signal and the LO to extract the range and velocity information, hence the performance of the FMCW LiDAR system is based on the ability to combine the two signals. Moreover, for fast scanning LiDAR systems, the descan may rapidly degrade the signal to noise ratio (SNR) of the optical receiver due to the spatial displacement of the target return signal and the LO signal at the detection plane. An optical lens is used to focus the target return signal and the LO signal onto the photodetector. The descan increases the difficulty to align the optical lens with respect to the target return signal and the LO signal.

Figure 3B:
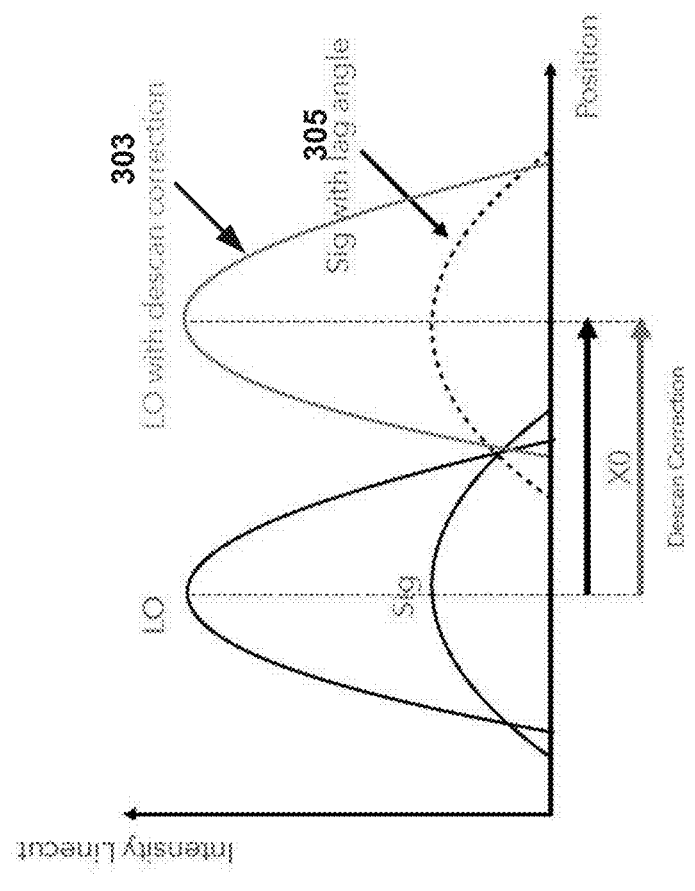
FIG. 3B is a diagram illustrating an example of intensity profile at a detection plane of a detector of a LiDAR system with descan compensation according to embodiments of the present disclosure.
Figure 3A:
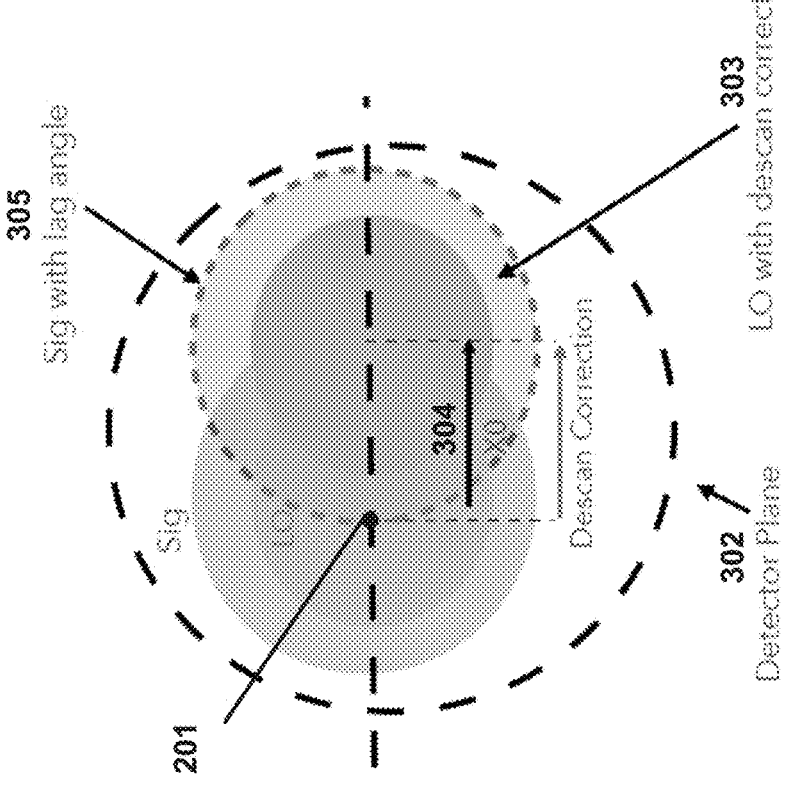
FIG. 3A is a diagram illustrating an example of a detection plane of a detector of a LiDAR system with descan compensation according to embodiments of the present disclosure.

FIG. 3A is a diagram illustrating an example of a detection plane 301 of a LiDAR system with descan compensation according to embodiments of the present disclosure. FIG. 3B is a diagram illustrating an example of intensity profile at the detection plane 301 in FIG. 3A, according to embodiments of the present disclosure. Referring to FIG. 3A and FIG. 3B, an optical subsystem of a LiDAR system (e.g., the system 100 in FIG. 1A) is configured to mitigate signal losses due to the lag-angle descan through the corrections such as a vertical (or horizontal) displacement of an imaging lens, or a tilted LO surface. Through the vertical lens displacement and/or the tilted LO surface, both an LO signal 303 and a target return signal 305 are shifted at the detection plane 301 of an optical receiver (e.g., one of the optical receivers 104). Due to the nature of the system, the LO signal 303 has a significantly larger sensitivity to the corrections relative to the target return signal 305. As illustrated in FIG. 3A, the LO signal 303 has a shift 304 due to the corrections which is much larger than a shift (not shown) of the target return signal 305. For example, the shift 304 of the signal 303 may be close to the misalignment 204. Thus, the misalignment between the LO signal 303 and the target return signal 305 may be compensated. Furthermore, in the LiDAR system, it is important to find a precise location of the optical lens which is used to focus the target return signal and LO signal onto the photodetector. By placing the optical lens at the precise location in order to maximize the overall signal to noise ratio of the LiDAR system may be maximized, and the performance of the LiDAR system may be improved.

Figure 4:
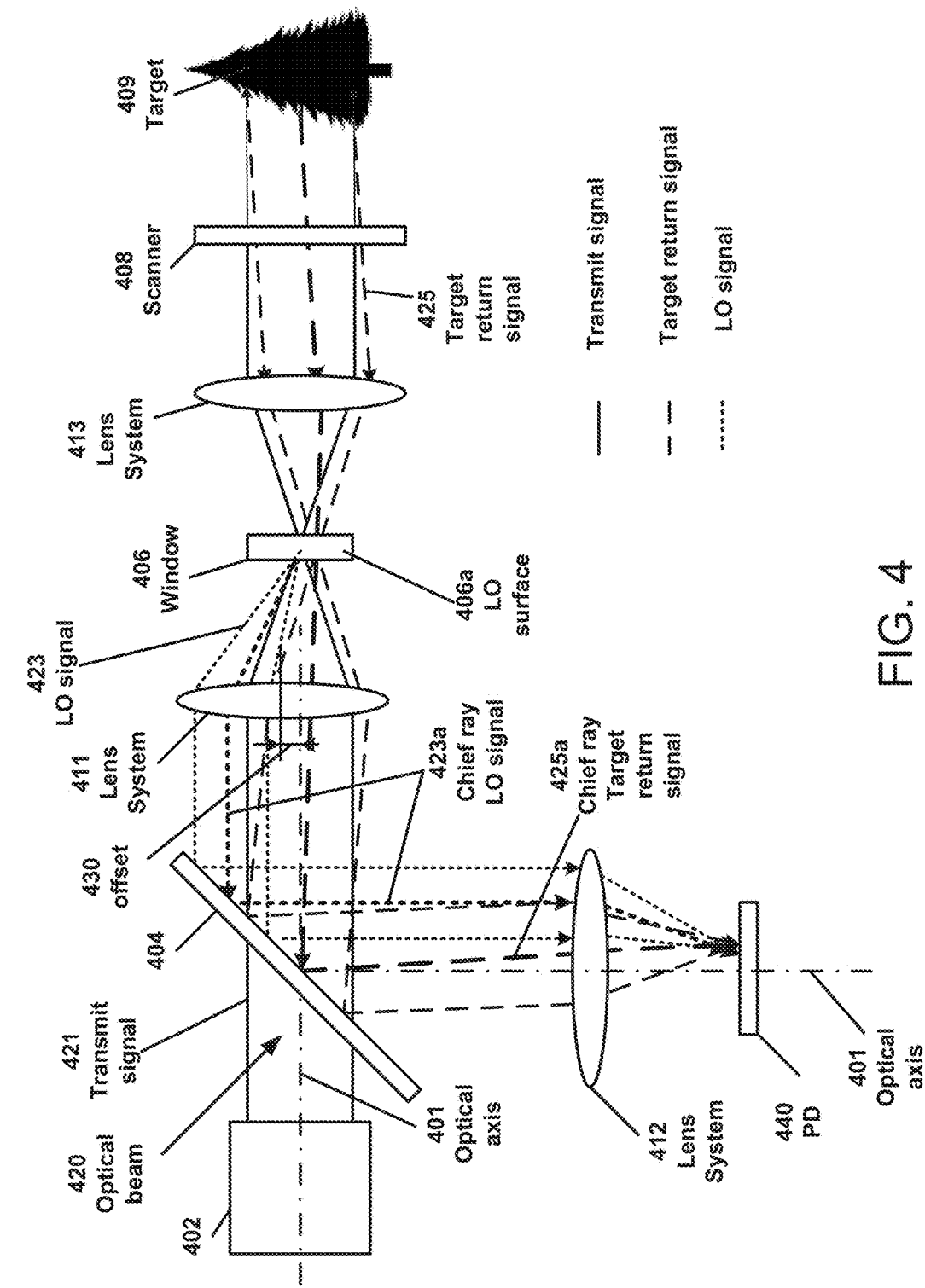
FIG. 4 is a diagram illustrating an example of an optical subsystem of a LiDAR system with descan compensation, according to embodiments of the present disclosure.

FIG. 4 is a diagram illustrating an example of an optical subsystem 400 of a LiDAR system with descan compensation by using an offset 430 of an imaging lens 410, according to embodiments of the present disclosure. The LiDAR system may be the LiDAR system 100 as illustrated in FIG. 1A. The optical subsystem 400 may include components from optical circuits 101, free space optics 115, optical scanners 102, and optical receivers 104. The optical subsystem 400 may include an optical source 402 (e.g., located in the optical circuits 101). The optical subsystem 400 may include a beam splitter (BS) 404 (or a polarizing beam splitter (PBS)), a lens system 411, an optical window 406, a lens system 412 and a lens system 413, which may be components of the free space optics 115 or the optical circuits 101. The optical subsystem 400 may include an optical scanner 408, which may include one of the optical scanners 102. The optical subsystem 400 may include a photodetector (PD) 440, which may include one of the optical receivers 104. The optical subsystem 400 may have an optical axis 401 to align the multiple optical components.

Referring to FIG. 4, the optical source 402 emits an optical beam 420. The optical beam 420 passes through the beam splitter (BS) 404 (e.g., a polarizing beam splitter (PBS)) and then is focused on the optical window 406, which may be a partially reflective window plate. In one scenario, a polarizing wave-plate or a Faraday rotator may be used to alter the reflected polarization from the optical window 406. The optical window 406 may include a flat or curved reflective surface, (e.g., which is a LO surface 406a) that is adapted to produce a LO signal.

The LO signal 423, which may be reflected light from the optical window 406, is imaged on a detection plane (not shown) of the PD 440 by the lens system 412. The target return signal 425 is imaged on the PD 440 by the lens system 412 as well. The coherent mixing between the LO signal 423 and the target return signal 425 on the PD 440 generates a radio frequency (RF) beat tone.

The optical beam 420 incident on the lens system 411 may be focused on the optical window 406. In the case of a stationary scanner, the target return signal path experiences no descan and is therefore coaxial with the LO signal path. As discussed above, when the scanner increases in speed, without descan compensation, the LO signal path and the target return signal path begin to depart and consequently deteriorate the mixing efficiency on the PD 440.

Referring to FIG. 4, the lens system 411 may be placed (e.g., fixed, installed, positioned, and the like) to have an offset 430 (e.g., displacement) from the optical axis 401 in a direction relative to the optical axis. For instance, the lens system 411 may be decentered on a plane perpendicular to the optic axis 401. For example, the lens system 411 may be moved in any direction perpendicular to the optic axis 401, such as an upward direction or a downward direction, or in/out of the page direction, or a combination of up/down and in/out of the page. It should be appreciated that the offset 430 in any direction perpendicular to the optical axis 401 may be referred to as a "vertical offset." For instance, the lens system 411 may have a positive vertical offset 430 from the optical axis 401 (e.g., being moved upward from the optical axis 401) or a negative vertical offset 430 from the optical axis 401 (e.g., being moved downward from the optical axis 401).

The optical beam 420, which is used to generate the LO signal 423, incidents at (or hits) the lens system 411 decentered from the optical axis 401 before the reflection, and the LO signal incidents at the decentered lens system 411 after the reflection. Thus, a chief ray 423a of the LO signal 423 at the lens system 412 is highly sensitive to the offset 430 of the lens system 411. On the other hand, there is a decenter acquired by the target return signal path on the lens system 412, but this is far less than what is experienced by the LO path due to its single pass nature. A chief ray 425a of the target return signal 425 at the lens system 412 is not highly sensitive to the offset 430 (e.g., vertical offset) of the lens system 411. Thus, the varying sensitivities to the offset 430 between the LO path and the target return signal path enables tuning capabilities to optimize the beam overlap of the LO signal and the target return signal at the detector plane. The chief ray 425a of the target return signal 425 and the chief ray 423a of the LO signal 423 at the lens system 412 have different sensitivities to the offset 430 of the lens system 411, which enables the increase of the overlap of the target return signal 425 and the LO signal 423 at the detection plane by the offset 430.

For example, the LO surface 406a of the optical window 406 may be disposed to have an offset from a focal plane (not shown) of the lens system 411. If the LO surface were at the focal plane of lens system 411 and the detection plane of the PD 440 were at the focal plane of lens system 412, the LO surface would be an intermediate image of the one found at the PD. A system of that nature would be insensitive to the offset 430 of the lens system 411. Introducing the displacement or offset along the optical axis 401 between the lens system 411 and the LO surface 406a as described by the embodiments herein allow for LO signals to be shifted and decentered at the detection plane of the PD 440. Additionally, shifting the position of the optical window 406 along the optical axis 401 may provide an adjustment mechanism for the size of the LO signal 423 and thus enable further tuning of the overlap between the target return signal 425 and the LO signal 423.

Referring to FIG. 4, the LO signal 423 is disposed to be decentered from the optical axis 401 on the lens system 412. The chief ray 423a of the LO signal 423 may be disposed to have an offset from the optical axis 401 on the lens system 412. The chief ray 423a of the LO signal 423 may be disposed to be decentered at the lens system 412 on the plane perpendicular to the optical axis 401. Thus, the chief ray 423a of the LO signal 423 may be shifted at the detection plane of the PD 440. As discussed above, when the optical scanner 408 operates at a high scan speed, the target return signal 425 will likely have a lag angle at the detection plane of the PD 440. By placing the lens system 411 with the offset 430, the chief ray 423a of the LO signal 423 may have a larger shift than the chief ray 425a of the target return signal 425 at the detection plane of the PD 440. Therefore, the overlap of the LO signal 423 and the target return signal 425 at the detection plane of the PD 440 may be increased. For example, the coherent mixing efficiency of the target return signal 425 and the LO signal 423 may be in part proportional to the percentage of the overlap of the LO signal 423 and the target return signal 425 on the detection plane of the PD 440.

The installation of the offset 430 in system 100 may be determined based on a scan speed of the optical scanner 408, a scanner geometry relative to the detection plane, and/or a range of the target. As an example, the magnitude of the offset 430 may be determined based on the scan speed. Hence, the higher the scan speed, the larger the offset 430. In some scenarios, the offset 430 may correspond to a current scan speed of system 100. The offset 430 may be determined such that a maximum coherent mixing efficiency of the target return signal 425 and the LO signal 423 occurs at the scan speed. The severity of the lag-angle descan may be determined on the scan speed of the optical scanner 408. Thus, the offset 430 may be determined based on the severity of the lag-angle descan. For example without limitation, the offset 430 (or displacement) from the optical axis 401 may be, but not limited to, 10 μm, 20 μm, 50 μm, 100 μm, 150 μm, 200 μm, 250 μm, 300 μm, 350 μm, 400 μm or any value therebetween In some embodiments, the offset 430 may be determined based on optical subsystem geometry. As another example, the direction of the offset 430 may be determined by the scanner geometry relative to the detection plane.

In one embodiment, the lens system 412 is aligned to maximize the overall signal to noise ratio of optical subsystem 400 of the LiDAR system. For instance, the lens system 412 may be placed to have an offset to an initial position, for example, the initial position may be a position corresponding to a minimum beam width of the LO signal. The offset may be determined based on the misalignment of the target return signal 425 and the LO signal 423, e.g., according to a simulation model. The techniques of aligning the lens system 412 will be discussed below.

Figure 5:
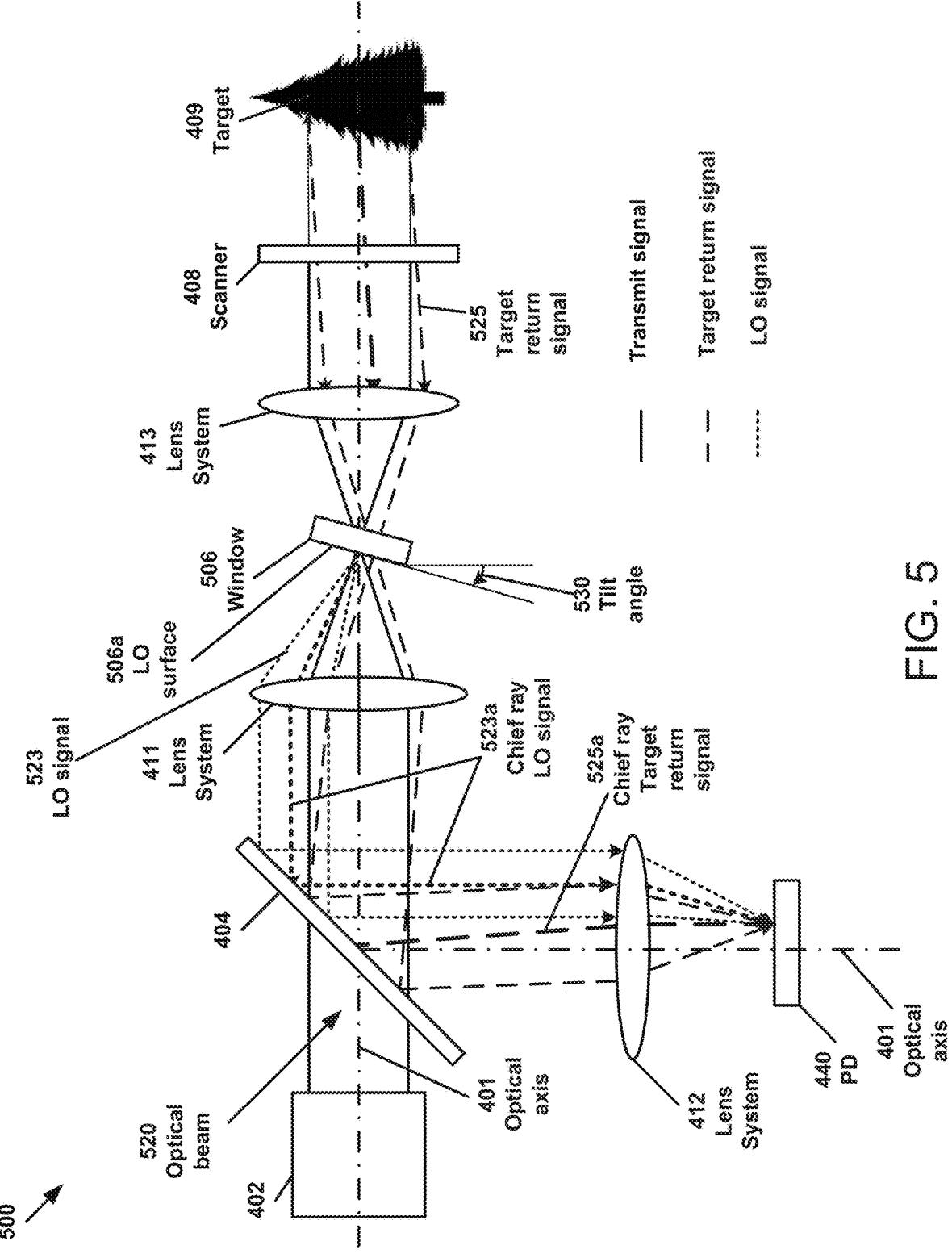
FIG. 5 is a block diagram illustrating another example of an optical subsystem of a LiDAR system with descan compensation according to embodiments of the present disclosure.

FIG. 5 is a block diagram illustrating an example of an optical subsystem 500 of a LiDAR system with descan compensation by a tilted optical window 506 according to embodiments of the present disclosure. The optical subsystem 500a is similar to the optical system 400 in FIG. 4, except the lens system 411 without offset from the optical axis 401 and the optical window 506 being tilted with an angle 530 with respect to a plane perpendicular to the optical axis 401. For example, the optical window 506a may be a plate with at least two parallel surfaces, where the LO surface 506a is either a front or back surface of the plate. The two parallel surfaces of the optical window 506 are disposed with the angle 530 with respect to the plane perpendicular to the optical axis 401. Similar to the optical subsystem 400, the LO surface 506a of the optical window 506 may be disposed to have a displacement or offset from a focal plane (not shown) of the lens system 411.

Referring to FIG. 5, the optical source 402 emits the optical beam 520. In a transmission path, the optical beam is a transmit signal 521. The optical beam 520 passes through the beam splitter (BS) 404 (or a polarizing beam splitter (PBS)) and then is focused on the optical window 506. The optical window 506 may transmit a portion of the optical beam 520 towards a target 409, and reflect a portion of the optical beam 520, by the LO surface 506a to generate an LO signal 423. The transmit signal 521 may pass through the optical window 506, and be collimated by using a lens system 413. Then, the transmit signal 521 may propagate to the optical scanner 408, and transmit to the target 409 to scan the target. The LO signal 523, which may be the reflected light from the optical window 506, is imaged on a detection plane of the PD 412 by the lens system 412. The reflected light from the target 409, which forms a target return signal 525. The target return signal 525 is imaged on the PD 440 by the lens system 412 as well. The coherent mixing between the LO signal 523 and the target return signal 525 generates a radio frequency (RF) beat tone.

As illustrated in FIG. 5, since the LO surface 506a is tilted with the tilt angle 530 with respect to the plane perpendicular to the optical axis 401, the LO signal 523 is shifted after reflection from the optical window 506. Thus, the chief ray 523a of the LO signal 523 is disposed to have an offset from the optical axis 401 on the lens system 411 and the lens system 412. The chief ray 523a of the LO signal 523 is disposed to be decentered at the lens system 412 on the plane perpendicular to the optical axis 401. Therefore, the chief ray 523a of the LO signal 523 is shifted at the detection plane of the PD 440. By tilting the LO surface 506a with the tilt angle 530, the chief ray 523a of the LO signal 523 has a larger shift than the chief ray 525a of the target return signal 525 at the detection plane of the PD 440. As a result, the overlap of the LO signal 523 and the target return signal 525 at the detection plane of the PD 440 is increased. The coherent mixing efficiency of the target return signal 525 and the LO signal 523 is increased because the mixing efficiency is in part proportional to the percentage of the overlap of the LO signal 523 and the target return signal 525 on the detection plane of the PD 440.

Similar to the offset 430, the tilt angle 530 of the LO surface 506a or 507a may be determined based on a scan speed of the optical scanner 408, a scanner geometry relative to the detection plane, and/or a range of the target. As an example, the magnitude of the tilt angle 530 may be determined based on the scan speed, such that a maximum coherent mixing efficiency of the target return signal 525 and the LO signal 523 occurs at the scan speed. The tilt angle 530 may be determined based on the angle of the chief ray 525a of the target return signal 525 with respect to the optical axis 401 at the detection plane of the PD 440, such that the maximum coherent mixing efficiency of the target return signal 525 and the LO signal 523 may occur and the descan may be compensated. For another example, the tilt angle 530 may be determined based on an angle of the chief ray 525a of the target return signal 525 with respect to the optical axis 401 at the lens system 412. In one embodiment, the tilt angle 530 may be 0.1°, 0.5°, 1°, 2°, 3°, 4°, 5°, 20° or any value therebetween. The above values are just a few examples. The values of the tilt angle 530 are not limited as such. The tilt angle 530 may have any values, depending on optical subsystem geometry. As another example, the direction of the tilt angle 530 may be determined by the scanner geometry relative to the detection plane (not limited to just one direction).

Similarly as discussed in connection with FIG. 4, the lens system 412 is aligned to maximize the overall signal to noise ratio of optical subsystem 500 of the LiDAR system. The lens system 412 may be placed to have an offset to an initial position, for example, the initial position may be a position corresponding to a minimum beam width of the LO signal. The offset may be determined based on the misalignment of the target return signal 525 and the LO signal 523, e.g., according to a simulation model. The techniques of aligning the lens system 412 will be discussed below.

Figure 6:
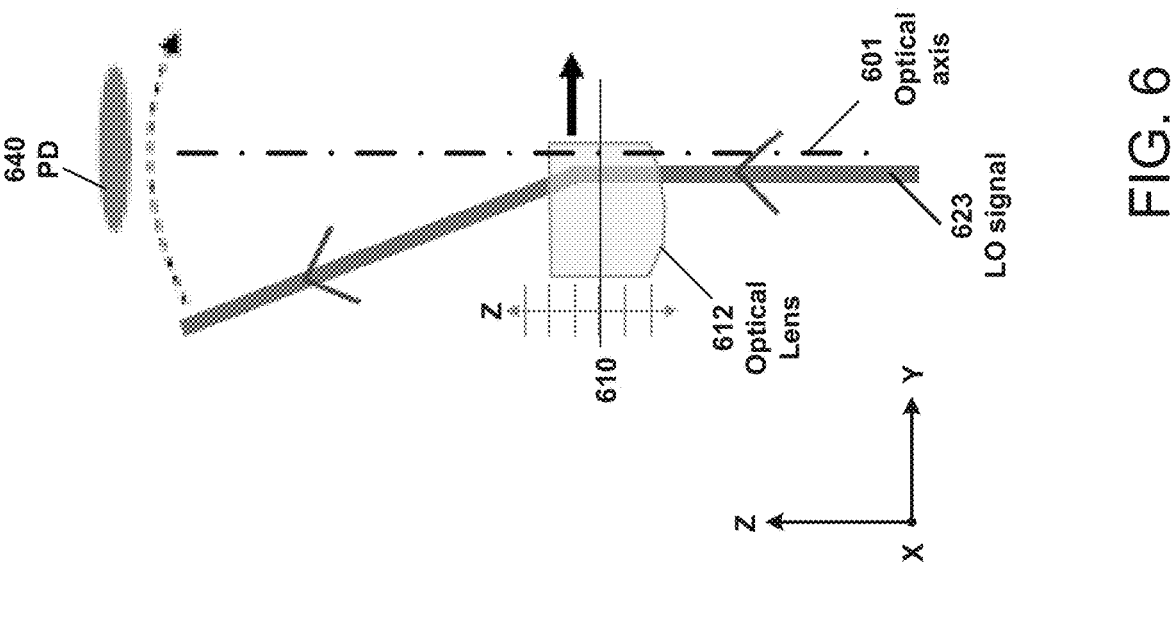
FIG. 6 is a diagram illustrating an example of aligning an optical lens in the optical subsystem of a LiDAR system, according to embodiments of the present disclosure.

FIG. 6 is a diagram illustrating an example of aligning an optical lens 612 in a LiDAR system, according to embodiments of the present disclosure. For example, the LiDAR system may be the LiDAR system 100 as described in connection with FIG. 1A. The optical lens 612 may be similar to the lens system 412 as described in connection with FIG. 4 or FIG. 5, which is used to focus the target return signal and local signal onto the photodetector 640 in an optical subsystem 600 with an optical axis 601.

At first, the optical lens 612 may be placed at a Z-position 610 along a Z-axis. The optical lens 612 may be placed on a translational stage, e.g., a 6-axis motorized stage. The optical source (e.g., optical source 402, optical source 502) of the LIDAR system emits the optical beam. As described herein, an optical window (e.g., optical window 406, optical window 506) generates the LO signal 623. Then, the optical lens 612 may be moved laterally (perpendicular to the optical axis 601), in an X-axis direction and a Y-axis direction, to scan across the LO signal 623. For example, the lens system 612 may be automatically moved on the translational stage in the X-axis direction and Y-axis direction using a computing device (e.g., the processor of signal processing unit 112) coupled to the translation stage.

The response of PD 640 to the LO signal 623 gives a characteristic line shape which can be fitted with a fitting function. The fitting function may be a full fitting function (e.g., a Gaussian fitting function) or a half fitting function (e.g., Sigmoid fitting function). The fitting function determines the characteristics of the LO signal 623 at the PD 640 for the Z-position 610. For example, the minimum beam width of the LO signal may be determined based on the Gaussian fitting function. The maximum slope coefficient of the LO signal may be determined based on the Sigmoid fitting function. The details of the fitting will be discussed below in connection with FIGS. 7A-7C, 8 and 9.

The optical lens 612 is then moved to a new Z-position along the Z-axis, and the process is repeated. The optical lens 612 moves to a set of Z-positions along the Z-axis and repeats the process discussed above. The characteristics of the LO signal at each Z-position is plotted to find an initial Z-position with the minimum beam width or the maximum slope coefficient of the LO signal 623.

Afterwards, a final Z-position is determined based on the initial Z-position with a predetermined offset. As discussed above in connection with FIG. 4, the displacement or offset along the optical axis between the lens system 411 and the LO surface 406a may allow for the LO signals to be shifted and decentered at the detection plane of the PD. For example, the displacement or offset along the optical axis between the lens system 411 and the LO surface 406a may be used together with the offset 430 (e.g., offset) for descan compensation. As a result, the optical lens 612 may be placed to have the predetermined offset from the initial Z-position along the optical axis for descan compensation. For example, the initial position may be a position corresponding to a minimum beam width of the LO signal on the PD 640. The predetermined offset may be determined based on the misalignment of the target return signal (not shown) and the LO signal 623, e.g., according to a simulation model of the optical subsystem 600 of LIDAR system. The final Z-position of the lens system 412 may be expressed as:

$$Z_f = Z_0 + Z_s,$$

where $Z_f$ represents the final Z-position of the lens system 412, $Z_0$ represents the initial Z-position of the lens system 412, and $Z_s$ represents the predetermined offset.

In this fashion, the optical lens 612 is placed in a precise location along all three axes with high accuracy and fast speed. The signal to noise ratio (SNR) at the PD is increased, and the performance of the LiDAR system is improved.

Figure 7A:
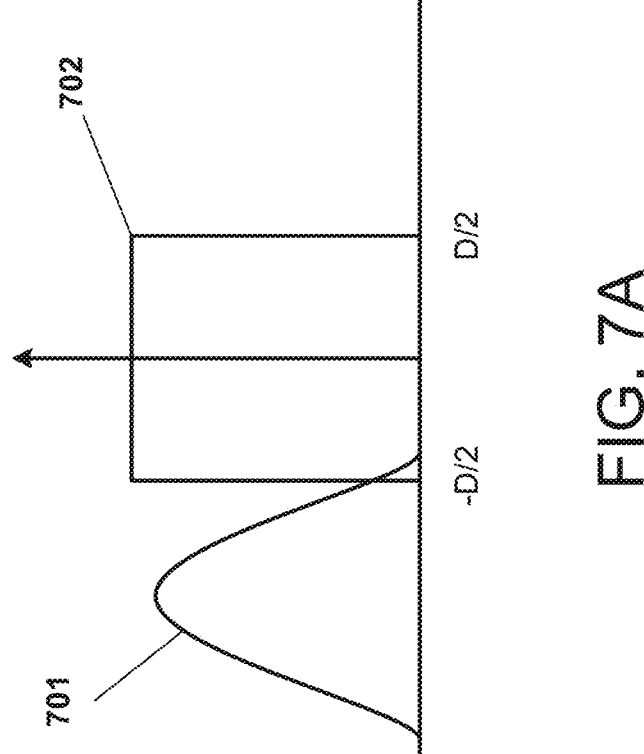
FIG. 7A is a diagram illustrating an example of generating a Gaussian fitting function according to embodiments of the present disclosure.

FIG. 7A is a diagram illustrating an example of generating a Gaussian fitting function according to embodiments of the present disclosure. As discussed above in connection with FIG. 6, the optical lens 612 may be placed at the Z-position 610 along a Z-axis. Then, the optical lens 612 may be moved laterally (perpendicular to the optical axis 601), in the X-axis direction and Y-axis direction, to scan across the LO signal 623. The resulting data of the response of the PD may be measured to produce a characteristic line shape of the LO signal which can be fitted with the fitting function. There are various fitting functions that can be used to fit the measurement data. As an example, a Gaussian fitting function may be used. As another example, a Sigmoid fitting function may be used.

Referring to FIG. 7A, the Gaussian fitting function may be generated by convolving a Gaussian function 701 with a fixed top hat (rectangular) function K 702. The resulted signal intensity of a Gaussian beam may be expressed as below:

$$I = G * K,$$
$$I = \exp\left(-2\left((x-a)^2 + y^2\right)/w^2\right) * \left(x^2 + y^2 < D^2\right),$$

where I represents the signal intensity, w represents a beam width of the Gaussian beam, a represents an X-axis positional offset of the Gaussian beam, D represents a diameter of a photodetector, x represents the distance from the center axis of the beam in X-direction, and y represents the distance from the center axis of the beam in Y-direction. The diameter of the photodetector may be determined based on the PD used in the LiDAR system. For example, the diameter of the photodetector may be 25, 50, 75, 100, 125 μm or any values therebetween.

Figure 7B:
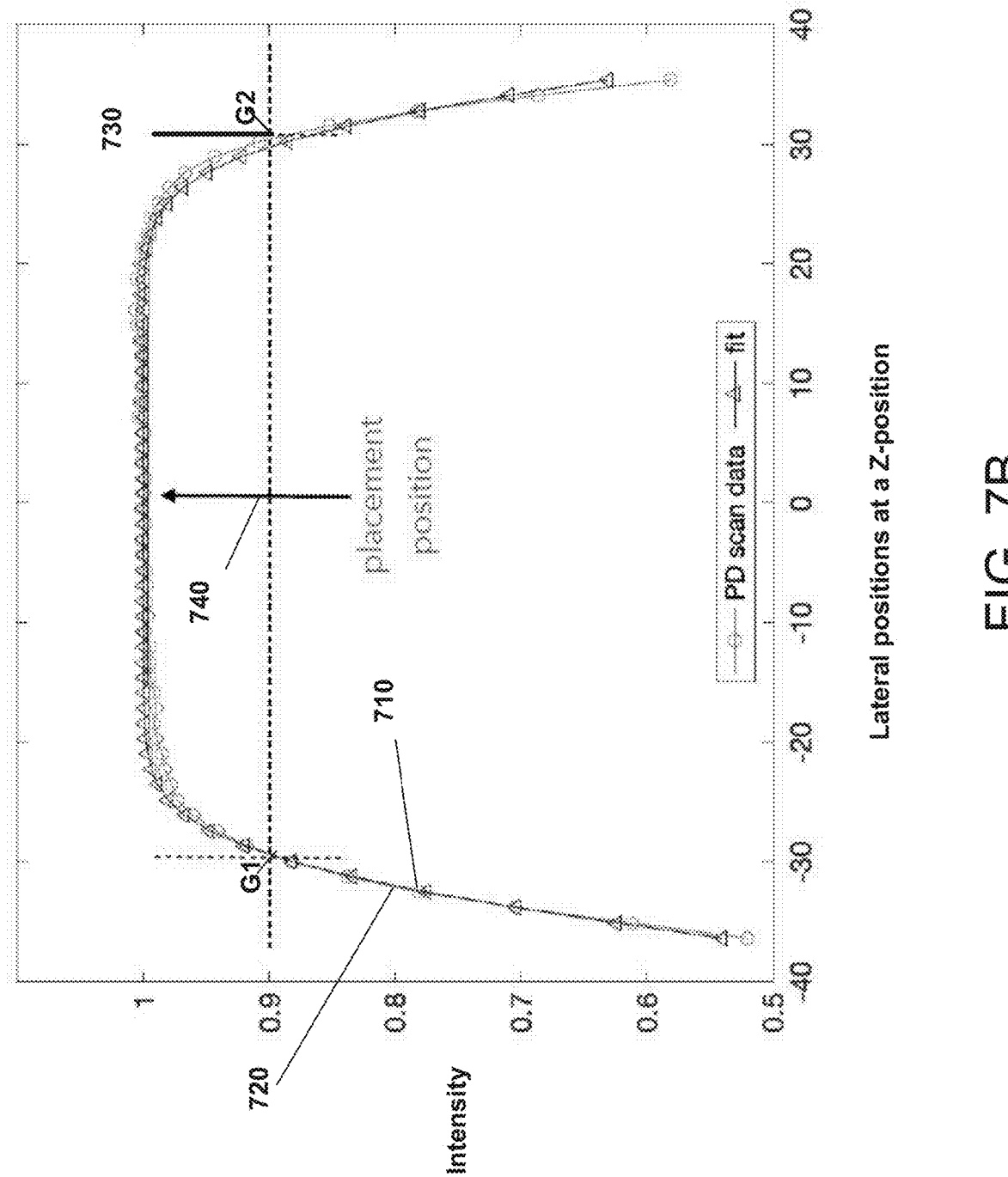
FIG. 7B is a diagram illustrating an example of data fitting using a Gaussian fitting function according to embodiments of the present disclosure.

FIG. 7B is a diagram illustrating an example of data fitting using a Gaussian fitting function according to embodiments of the present disclosure. In one example, the fitting function may be a full fitting function using a Gaussian fitting function. Referring to FIG. 7B, at a Z-position, the optical lens (e.g., optical lens 612) moves across the LO signal (e.g., LO signal 623) in a lateral direction (X-direction or Y-direction). Multiple data 710 of the response of the PD (e.g., PD 640) to the LO signal (e.g., LO signal 623) may be measured at multiple lateral positions as illustrated in FIG. 7B. The measurement data 710 may be fitted using the Gaussian fitting function 720. The Gaussian fitting function 720 may be determined by varying the fitting parameter, for example, the beam width w or photodetector diameter D, to fit the measurement data 710.

For example, a predetermined threshold 730 may be used to determine a lateral placement position 740 of the optical lens (e.g., optical lens 612). In one embodiment, the lateral placement position 740 may be determined to be at a center of a portion G1G2 of the Gaussian fitting function 720 above the predetermined threshold 730. In another embodiment, the lateral placement position 740 may be determined to be at 20%, 30%, 40%, 50%, 60%, 70%, 80% or any values therebetween of the portion G1G2 of the Gaussian fitting function 720 above the predetermined threshold 730. As an example, the lateral position may be the X-position. At the Z-position as illustrated in FIG. 7B, in one embodiment, the placement X-position may be the center of the portion of the Gaussian fitting function 720 above the predetermined threshold 730; in another embodiment, the placement X-position may be at 20%, 30%, 40%, 50%, 60%, 70%, 80% or any values therebetween of the portion G1G2 of the Gaussian fitting function 720 above the predetermined threshold 730. For the Z-position that is the final Z-position, the placement X-position may be the final X-position for the optical lens. The final Y-position for the optical lens may be determined similarly.

The Gaussian fitting function 720 determines the characteristics of the LO signal (e.g., LO Signal 623) at the PD (e.g., PD 640) for the Z-position. Based on the Gaussian fitting function 720, the beam width of the Gaussian fitting function may be determined. The beam width of the Gaussian fitting function is the beam width of the LO signal in this situation. Thus, the beam width of the LO signal when the optical lens is placed at this Z-position may be determined based on the Gaussian fitting function 720, as illustrated in FIG. 7B.

Figure 7C:
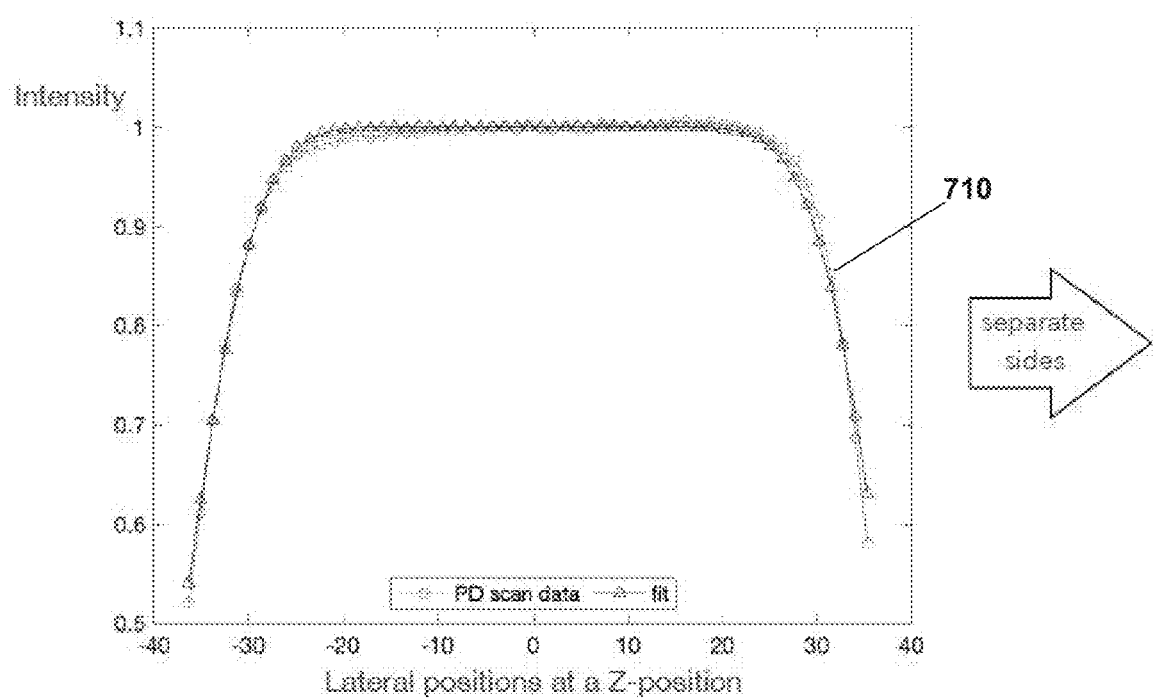
FIG. 7C is a diagram illustrating an example of data fitting using a Sigmoid fitting function according to embodiments of the present disclosure.
Figure 7C:
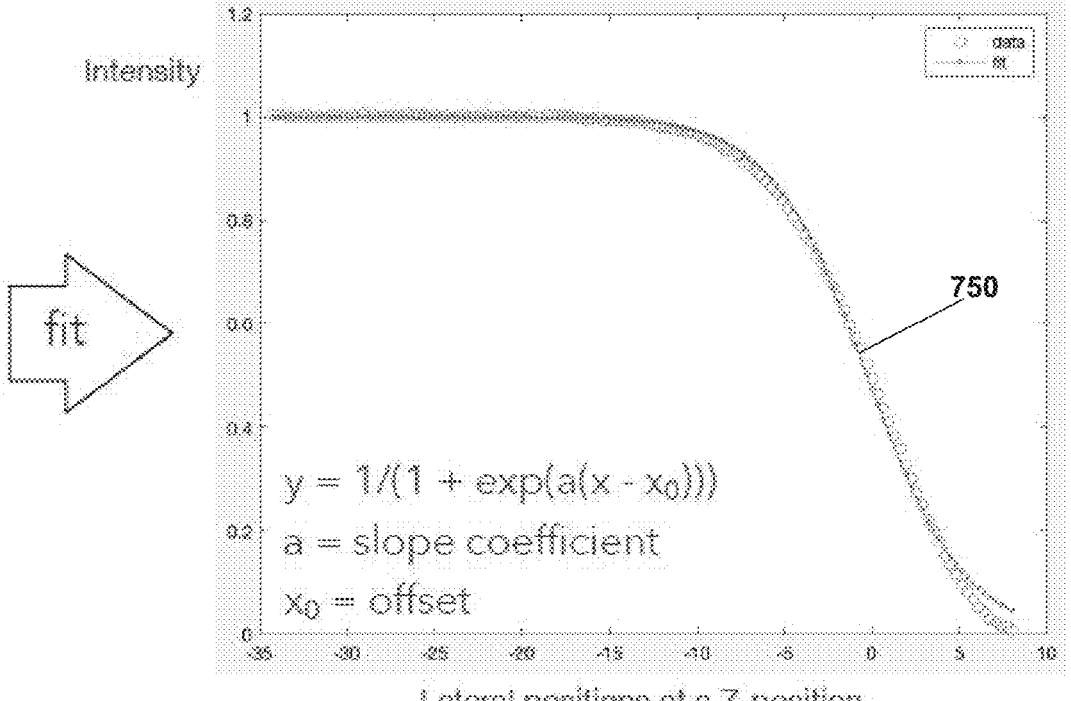

FIG. 7C is a diagram illustrating an example of data fitting using a Sigmoid fitting function according to embodiments of the present disclosure. In one example, the fitting function may be a half fitting function using a Sigmoid fitting function. Referring to FIG. 7C, multiple measurement data 710 of the response of the PD (e.g., PD 640) to the LO signal (e.g., LO Signal 623) may be collected. For the Sigmoid fitting function, only half of the multiple measurement data 710 may be needed. The measurement data 710 may be fitted using the Sigmoid fitting function 750. The Sigmoid fitting function 750 may be expressed as below:

$$I = 1/(1 + (\exp(a*(x-x_0)))),$$

where I represents the signal intensity, a represents the slope efficiency, x represents the distance from the center axis of the beam in X-direction or Y-direction, $x_0$ is an offset in the X-direction or Y-direction, which may be set to zero. The Sigmoid fitting function 750 may be determined by varying the fitting parameter, for example, the slope efficiency a, to fit the measurement data 710.

The Sigmoid fitting function 750 determines the characteristics of the LO signal at the PD for the Z-position. Based on the Sigmoid fitting function 750, the slope efficiency of the Sigmoid fitting function 750 may be determined. The slope efficiency of the Sigmoid fitting function 750 corresponds to the beam width of the LO signal in this situation. The slope efficiency of the LO signal when the optical lens is placed at this Z-position may be determined based on the Sigmoid fitting function 750, as illustrated in FIG. 7C. The Sigmoid fitting function 750 may need less measurement data and data fitting for the Sigmoid fitting function 750 and may be faster than for the Gaussian fitting function 720.

Figure 8:
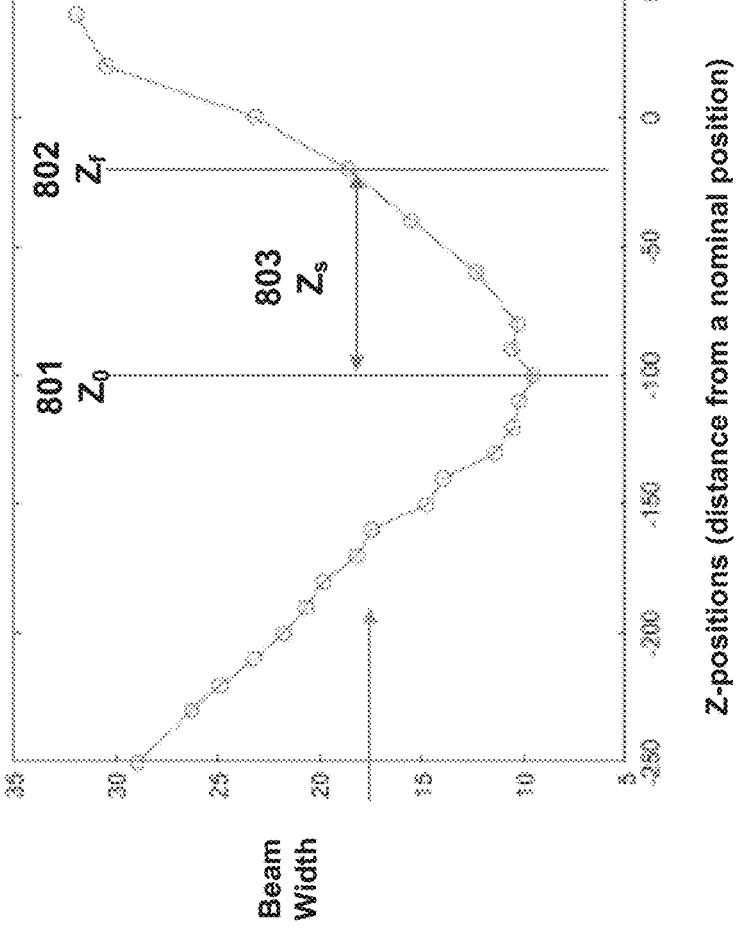
FIG. 8 is a diagram illustrating an example of finding a Z-position of a minimum LO beam width and an offset from the Z-position using a Gaussian fitting function according to embodiments of the present disclosure.

FIG. 8 is a diagram 800 illustrating an example of finding a position of a minimum LO beam width and an offset from the position using the Gaussian fitting function according to embodiments of the present disclosure. As discussed above, the beam width of the LO signal when the optical lens is placed at a Z-position may be determined based on the Gaussian fitting function at the Z-position. When the optical lens is stepped through multiple Z-positions by moving in the Z-direction, multiple beam widths of the LO signal corresponding to the multiple Z-positions may be obtained. The initial Z-position $Z_0$ 801 may be determined based on the Z position corresponding to the minimum beam width, as illustrated in FIG. 8. As discussed above, the final Z-position $Z_f$ 802 of the optical lens may be determined by a combination of the initial Z-position $Z_0$ and the predetermined offset $Z_s$ 803. The predetermined offset 803 may be determined based on the misalignment of the target return signal and the LO signal (e.g., LO signal 623) for descan compensation.

Figure 9:
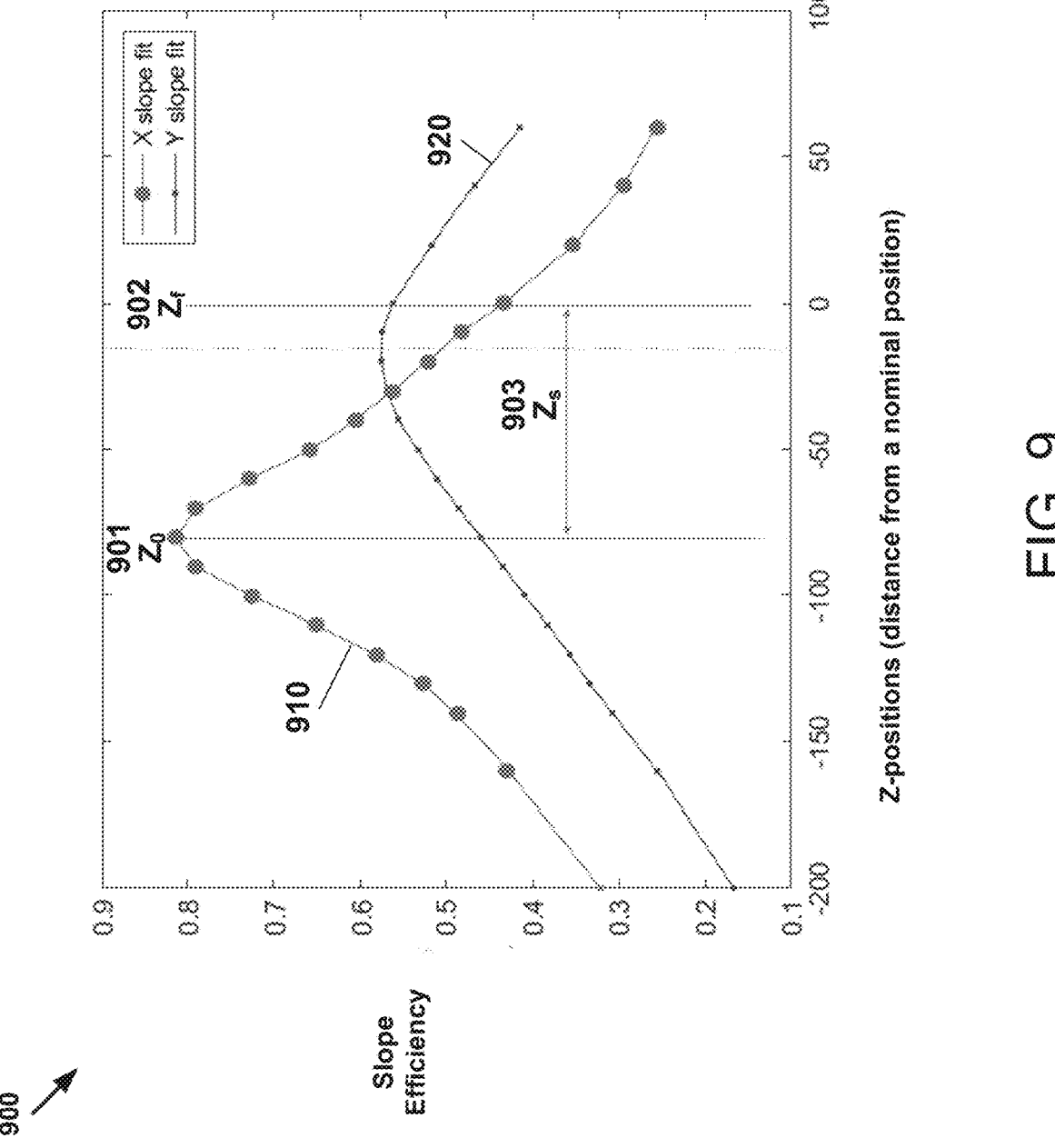
FIG. 9 is a diagram illustrating an example of finding a Z-position of the minimum LO beam width and an offset from the Z-position using a Sigmoid fitting function according to embodiments of the present disclosure.

FIG. 9 is a diagram 900 illustrating an example of finding the Z-position of the minimum LO beam width and an offset from the Z-position using the Sigmoid fitting function according to embodiments of the present disclosure. As discussed above, the slope efficiency of the LO signal when the optical lens is placed at a Z-position may be determined based on the Sigmoid fitting function at the Z-position. The slope efficiency of the Sigmoid fitting function 750 may correspond to the beam width of the LO signal at the Z-position. The optical lens 612 may be moved laterally (perpendicular to the optical axis 601), in the X-axis direction or Y-axis direction, to scan across the LO signal 623. The slope efficiency of the Sigmoid fitting function 750 may be obtained by moving laterally in the X-axis direction or in the Y-direction.

When the optical lens is stepped through multiple Z-positions in the Z-direction, multiple slope efficiencies of the Sigmoid fitting function corresponding to the multiple Z-positions may be obtained. The multiple slope efficiencies of the Sigmoid fitting function may be plotted versus the multiple Z-positions, as illustrated in FIG. 9. Line 910 may represent X-slope fit, in which multiple slope efficiencies of the LO signal are obtained by the Sigmoid fitting function when the optical lens is moved laterally in the X-direction. Line 910 may represent Y-slope fit, in which multiple slope efficiencies of the LO signal are obtained by the Sigmoid fitting function when the optical lens is moved laterally in the Y-direction. The Z-position of the maximum slope efficiency may correspond to the Z-position of the minimum beam width of the LO signal. The Z-position of the maximum slope efficiency may be determined by the X-slope fit 910 (e.g., moving the optical lens laterally in the X-direction), or the Y-slope fit 920 (e.g., moving the optical lens laterally in the Y-direction), or a combination of the X-slope fit 910 and the Y-slope fit 920. In one example, the initial Z-position $Z_0$ 901 may be determined based on the maximum slope efficiency based on the X-slope fit 910, as illustrated in FIG. 9. In another example, the initial Z-position $Z_0$ may be determined based on the maximum slope efficiency based on the Y-slope fit 920. In yet another example, the initial Z-position $Z_0$ may be determined based on the maximum slope efficiency based on a combination of the X-slope fit 910 and the Y-slope fit 920, e.g., an average of a first initial Z-position $Z_0$ based on the X-slope fit 910 and a second initial Z-position $Z_0$ based on the Y-slope fit 920. Afterwards, the final Z-position $Z_f$ 902 of the optical lens may be determined by a combination of the initial Z-position $Z_0$ and the predetermined offset $Z_s$ 903. The predetermined offset 903 may be determined based on the misalignment of the target return signal and the LO signal (e.g., LO signal 623) for descan compensation.

FIG. 10 is a flow diagram illustrating an example of a method 1000 of aligning an optical lens in a LiDAR system according to embodiments of the present disclosure. Referring to FIG. 10, at block 1002, an optical beam is emitted by an optical source. At block 1006, a local oscillator (LO) signal is generated by an LO generator based on the optical beam. At block 1008, an optical lens is placed in front of a photodetector at a first predetermined position. At block 1010, the optical lens is moved to a plurality of Z-positions along a direction of an optical axis, by a processor. At block 1012, for each of the plurality of Z-positions, the optical lens is moved perpendicular to the direction of the optical axis to a set of lateral positions for a Z-position, by the processor. At block 1014, a set of values of the LO signal at the set of lateral positions is received by the photodetector.

At block 1016, a fitting function is generated based on the set of values of the LO signal by the processor. At block 1018, a parameter value of the LO signal for the Z-position is determined by the processor. At block 1020, an initial Z-axis position of the optical lens is determined by the processor by selecting a Z-position from the plurality of Z-positions based on the plurality of parameter values. At block 1022, a final Z-position of the optical lens is determined by the processor by adding an offset to the initial Z-axis position, and aligning the optical lens based on the final Z-position to improve an accuracy of at least one of range or velocity information of a target. In one embodiment, the offset is a positive value. In another embodiment, the offset is a negative value or zero.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the present embodiments, including what is described in the Abstract, is not intended to be exhaustive or to limit the present embodiments to the precise forms disclosed. While specific implementations of, and examples for, the present embodiments are described herein for illustrative purposes, various equivalent modifications are possible within the scope of the present embodiments, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method of aligning an optical lens in a frequency modulated continuous wave (FMCW) light detection and ranging (LiDAR) system, comprising:
   emitting an optical beam by an optical source;
   generating a local oscillator (LO) signal based on the optical beam;
   placing the optical lens in front of a photodetector at a first predetermined position;
   moving the optical lens to a plurality of Z-positions along a direction of an optical axis, the plurality of Z-positions corresponding to a plurality of parameter values of the LO signal,
   for each of the plurality of Z-positions,
      moving the optical lens perpendicular to the direction of the optical axis to a set of lateral positions for a Z-position;
      receiving a set of values of the LO signal at the set of lateral positions by the photodetector;
      generating a fitting function based on the set of values of the LO signal; and
      determining a parameter value of the LO signal for the Z-position;
   determining an initial Z-axis position of the optical lens by selecting a Z-position from the plurality of Z-positions based on the plurality of parameter values;
   determining a final Z-position of the optical lens by adding an offset to the initial Z-axis position; and
   aligning the optical lens based on the final Z-position to improve an accuracy of at least one of range or velocity information of a target.

2. The method of claim 1, wherein the moving the optical lens perpendicular to the direction of the optical axis to the set of lateral positions for the Z-position comprises:

moving the optical lens along a direction of an X-axis to a set of X-positions for the Z-position.

3. The method of claim 2, further comprising: determining an X-axis position of the optical lens based on the fitting function according to a cutoff threshold of the set of values of the LO signal.

4. The method of claim 1, wherein the moving the optical lens perpendicular to the direction of the optical axis to the set of lateral positions for the Z-position comprises moving the optical lens along a direction of a Y-axis to a set of Y-positions for the Z-position.

5. The method of claim 4, further comprising: determining a Y-axis position of the optical lens based on the fitting function according to a cutoff threshold of the set of values of the LO signal.

6. The method of claim 1, wherein the fitting function comprises a full fitting function, where the LO signal includes a Gaussian beam, wherein the parameter value of the LO signal comprises a width of the Gaussian beam, and wherein the plurality of parameter values of the LO signal comprise a plurality of widths of the Gaussian beam.

7. The method of claim 6, wherein the determining the initial Z-axis position of the optical lens by selecting a Z-position from the plurality of Z-positions based on the plurality of parameter values comprises: determining the initial Z-axis position of the optical lens by selecting a Z-position from the plurality of Z-positions which has a minimum width among the plurality of widths of the LO signal.

8. The method of claim 1, wherein the fitting function comprises a Sigmoid fitting function, wherein the parameter value of the LO signal comprises a slope of the fitting function of the LO signal, and wherein the plurality of parameter values of the LO signal comprise a plurality of slopes of the fitting function of the LO signal.

9. The method of claim 8, wherein the determining the initial Z-axis position of the optical lens by selecting a Z-position from the plurality of Z-positions based on the plurality of parameter values comprises: determining the initial Z-axis position of the optical lens by selecting a Z-position from the plurality of Z-positions which has a maximum slope among the plurality of slopes.

10. The method of claim 1, wherein the offset compensates for a displacement of a target return signal and the LO signal on the photodetector.

11. The method of claim 10, further comprising: determining the displacement of the target return signal and the LO signal on the photodetector; and determining the offset based on the displacement of the target return signal and the LO signal on the photodetector.

12. A light detection and ranging (LiDAR) system, comprising: a processor; and a memory to store instructions that, when executed by the processor, cause the LiDAR system to: emit an optical beam by an optical source; generate a local oscillator (LO) signal based on the optical beam; place an optical lens in front of a photodetector at a first predetermined position; move the optical lens to a plurality of Z-positions along a direction of an optical axis, the plurality of Z-positions corresponding to a plurality of parameter values of the LO signal, for each of the plurality of Z-positions, move the optical lens perpendicular to the direction of the optical axis to a set of lateral positions for a Z-position; receive a set of values of the LO signal at the set of lateral positions by the photodetector; generate a fitting function based on the set of values of the LO signal; and determine a parameter value of the LO signal for the Z-position; determine an initial Z-axis position of the optical lens by selecting a Z-position from the plurality of Z-positions based on the plurality of parameter values; determine a final Z-position of the optical lens by adding an offset to the initial Z-axis position; and align the optical lens based on the final Z-position to improve an accuracy of at least one of range or velocity information of a target.

13. The LiDAR system of claim 12, wherein the fitting function comprises a full fitting function, where the LO signal includes a Gaussian beam, wherein the parameter value of the LO signal comprises a width of the Gaussian beam, and wherein the plurality of parameter values of the LO signal comprise a plurality of widths of the Gaussian beam, and wherein the LiDAR system is further to: determine the initial Z-axis position of the optical lens by selecting a Z-position from the plurality of Z-positions which has a minimum width among the plurality of widths of the LO signal.

14. The LiDAR system of claim 12, wherein the fitting function comprises a Sigmoid fitting function, wherein the parameter value of the LO signal comprises a slope of the fitting function of the LO signal, wherein the plurality of parameter values of the LO signal comprise a plurality of slopes of the fitting function of the LO signal, and wherein the LiDAR system is further to: determining the initial Z-axis position of the optical lens by selecting a Z-position from the plurality of Z-positions which has a maximum slope among the plurality of slopes.

15. The LiDAR system of claim 12, wherein the offset compensates for a displacement of a target return signal and the LO signal on the photodetector.

16. The LiDAR system of claim 15, wherein the LiDAR system is further to: determine the displacement of the target return signal and the LO signal on the photodetector; and determine the offset based on the displacement of the target return signal and the LO signal on the photodetector.

17. A light detection and ranging (LiDAR) system, comprising: an optical source to emit an optical beam; a local oscillator (LO) to generate an LO signal based on the optical beam; a photodetector to receive the LO signal and a target return signal; a circuitry; and a memory to store instructions that, when executed by the circuitry, cause the LiDAR system to: place an optical lens in front of the photodetector at a first predetermined position; move the optical lens to a plurality of Z-positions along a direction of an optical axis, the plurality of Z-positions corresponding to a plurality of parameter values of the LO signal, for each of the plurality of Z-positions, move the optical lens perpendicular to the direction of the optical axis to a set of lateral positions for a Z-position;

receive a set of values of the LO signal at the set of lateral positions by the photodetector;

generate a fitting function based on the set of values of the LO signal; and determine a parameter value of the LO signal for the Z-position;

determine an initial Z-axis position of the optical lens by selecting a Z-position from the plurality of Z-positions based on the plurality of parameter values;

determine a final Z-position of the optical lens by adding an offset to the initial Z-axis position; and align the optical lens based on the final Z-position to improve an accuracy of at least one of range or velocity information of a target.

18. The LiDAR system of claim 17, wherein the fitting function comprises a full fitting function, wherein the parameter value of the LO signal comprises a width of the LO signal, wherein the plurality of parameter values of the LO signal comprise a plurality of widths of the LO signal, and wherein the LiDAR system is further to:

determine the initial Z-axis position of the optical lens by selecting a Z-position from the plurality of Z-positions which has a minimum width among the plurality of widths of the LO signal.

19. The LiDAR system of claim 17, wherein the fitting function comprises a Sigmoid fitting function, wherein the parameter value of the LO signal comprises a slope of the fitting function of the LO signal, wherein the plurality of parameter values of the LO signal comprise a plurality of slopes of the fitting function of the LO signal, and wherein the LiDAR system is further to:

determining the initial Z-axis position of the optical lens by selecting a Z-position from the plurality of Z-positions which has a maximum slope among the plurality of slopes.

20. The LiDAR system of claim 17, wherein the offset compensates for a displacement of a target return signal and the LO signal on the photodetector, and wherein the LiDAR system is further to:

determine the displacement of the target return signal and the LO signal on the photodetector; and determine the offset based on the displacement of the target return signal and the LO signal on the photodetector.

* * * * *